United States Patent

Galpin

[11] Patent Number: 5,392,327
[45] Date of Patent: Feb. 21, 1995

[54] TERMINATION UNIT WITH MAINTENANCE FACILITY

[75] Inventor: Robert K. P. Galpin, Chippenham, England

[73] Assignee: GPT Limited, United Kingdom

[21] Appl. No.: 993,599

[22] Filed: Dec. 21, 1992

[30] Foreign Application Priority Data

Jan. 8, 1992 [GB] United Kingdom ............... 9200332

[51] Int. Cl.⁶ .................. H04M 1/24; H04M 3/08; H04M 3/22; H04J 1/16
[52] U.S. Cl. ................................. 379/2; 379/5; 379/27; 379/29; 379/30; 370/13; 370/15
[58] Field of Search ........... 379/1, 2, 8, 5, 27, 379/26, 29, 30; 370/13, 14, 15, 17, 110.1; 375/10, 36

[56] References Cited

U.S. PATENT DOCUMENTS

| | | | |
|---|---|---|---|
| 3,773,986 | 11/1973 | Tremblay | 179/175.3 |
| 4,041,255 | 8/1977 | Cambridge et al. | 179/175.3 R |
| 4,438,299 | 3/1989 | Tomim | 179/175.3 F |
| 4,700,380 | 10/1987 | Ahuja | 379/387 X |
| 4,807,277 | 2/1989 | Perry | 379/8 |
| 4,984,250 | 1/1991 | Koyama | 375/36 |
| 5,195,124 | 3/1993 | Ishioka | 379/8 X |

*Primary Examiner*—Stephen Chin
*Assistant Examiner*—Paul Loomis
*Attorney, Agent, or Firm*—Kirschstein, Ottinger, Israel & Schiffmiller

[57] ABSTRACT

There is a demand for user access to ISDN services at the two-wire interface point. The frequently raised objection to such access is the problem of determining the location of a fault and hence the responsibility for the fault. This is solved by the use of a voltage sensor responsive to a DC voltage less than a normal line feed voltage within a voltage range not used in normal operation to control a switch operative to disconnect a subscriber termination unit from the line, and to provide a known linear terminating impedance for the line for the duration of the application of the DC voltage.

6 Claims, 1 Drawing Sheet

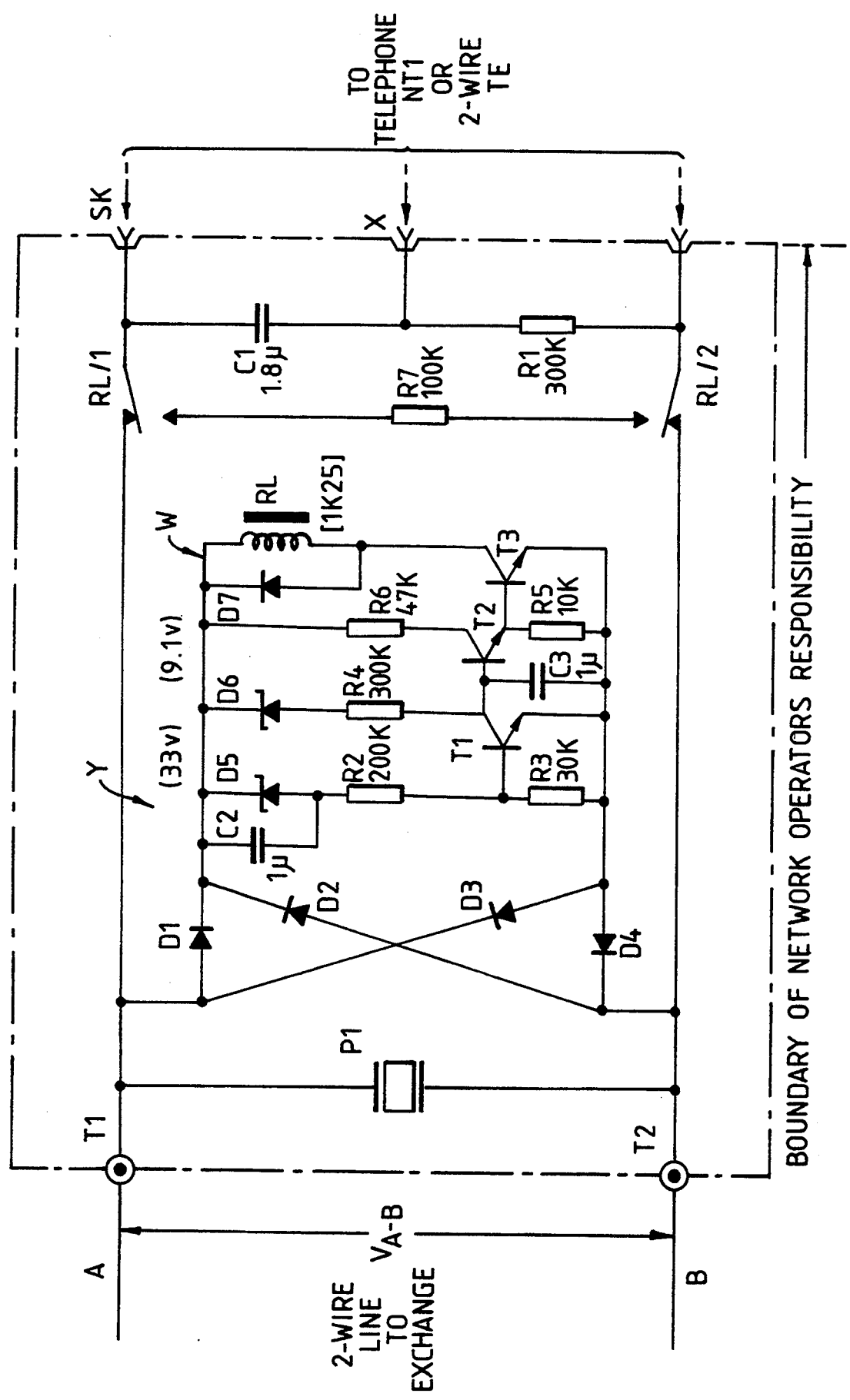

TERMINATION UNIT WITH MAINTENANCE FACILITY

BACKGROUND OF THE INVENTION

The Commission of the European Economic Community (EEC) has called for the provision of user access to basic Integrated Services Digital Network (ISDN) services at the 'U' (2-wire) interface point within their proposals for the ONP programme. 2-wire user access to basic ISDN is seen as an inevitable step towards the cost-effective provision of the service and has been included in various presentations for over two years.

The regularly aired objection to 2-wire user access is that the maintenance facilities (loopbacks) that could be provided in the Network Terminator 1 (NT1) would not be under the control and responsibility of the Network Operator, and that therefore the determination of responsibility for rectifying a service failure would become more difficult. Objectors will quote network operators' comments to that effect from the USA, where 2-wire access is a legal requirement, and from Japan.

While objection has been vehement from some quarters, the cost and flexibility advantages of 2-wire user access to basic ISDN have been recognised and suppliers would like to offer it if only the maintenance responsibility problem could be solved.

A solution to this problem is proposed by means of an enhancement to the termination unit fitted at the subscriber's premises for Plain Ordinary Telephone Service (POTS) which will provide a simple maintenance facility and which, once fitted, will be usable both for 2-wire basic ISDN service and for POTS.

One solution for testing subscriber's lines was developed by British Telecom (BT) for 2-wire and 4-wire private circuits, where determining the responsibility for service failure is a much more urgent problem (financially) than an ordinary subscriber's access failure. This was the Automatic Loopback Equipment (ALE) the 2-wire circuit version being implemented as the Test Unit 21B. This unit, which is powered either from the line or from a local supply, responds to a command tone from the test facility by disconnecting the subscriber's equipment with a relay and transmitting a tone of 800 Hz back to the test facility for a period of 60 seconds, from which the loss of the line can be determined. The unit then releases the relay and resumes its normal transparent mode of operation.

This approach is far too complex and expensive for general deployment on customer's access lines, where a simple low cost termination unit is needed, comparable in size with the Network Termination Equipment 5 (NTE5), which can be used without modification for either 2-wire ISDN or POTS.

Another solution is described in U.S. Pat. No. 3,773,986 (Tremblay), which like the BT/ALE described above requires a local power source and wherein the test unit resides in its test mode for a predetermined period before automatically restoring the line to normal operation.

Yet another approach is described in U.S. Pat. No. 4,041,255 (Cambridge) which addresses the power problem of Tremblay by using a magnetically-latching relay and the predetermined timing constraint problem by triggering the relay 'on' and 'off' by current derived from high voltage signals of opposite polarity applied to the line from the central office.

A further problem which is common to the arrangements described in both Tremblay and Cambridge is that the DC control signals sent from the central office to operate the test mode have to be substantially higher than the voltages applied to the line during normal operation to avoid the possibility of spurious operation of the test mode. While this may be acceptable on lines used for normal telephone services (POTS), DC line feed voltages for ISDN services in some networks are already limited by safety regulations; so applying significantly higher voltages to the line is not a practical proposition. Moreover, since the trigger voltage (substantially higher than the normal line voltage) used in the arrangement described by Cambridge is obtained by charging a capacitor from the line, the voltage applied by the central office will be yet higher, this additional voltage margin being a factor in determining the operate/restore delay times of the test mode.

The principal problems of the prior art can be summarised as follows:

1. Fixed, automatically reset test period (BT/ALE and Tremblay): If this time is long enough for on-demand fault diagnosis, it will be far too long to permit efficient routine testing of good lines for preventitive maintenance.
2. Need for local powering (BT/ALE and Tremblay): Either local powering or trickle-charging a battery is expensive and unreliable.
3. Magnetically-latching relay (Cambridge): This is an expensive and sensitive device.
4. Excessively high voltages needed for test mode (Tremblay and Cambridge): These high voltages cannot be provided on ISDN lines where line feed voltages for normal operation are already close to the limits set by safety regulations in many networks.

SUMMARY OF THE INVENTION

These problems are solved by the present invention which offers a simple and low cost termination unit incorporating a test facility, suitable for use with either POTS or 2-wire ISDN services without modification and which is switched into and out of the test mode by DC control voltages within the normal operational line feed voltage limits. Direct control of the test mode from the exchange/central office permits both rapid line measurement for routine testing of good lines for preventitive maintenance and unlimited test time for on-demand testing of faulty lines.

A proposal has been made by Ericsson Telecom to an European Telecommunications Standards Institute (ETSI) committee dealing with standards for basic ISDN access that the Network Termination Unit 1 (NT1) should operate in two distinct modes.

Firstly, with an input voltage below 10 volts the input leakage current shall be less than 10 microamps and secondly, with an input voltage of above 30 volts the NT1 should operate in a normal mode. The premise is that the NT1 should not function as a power sink during testing, but the NT1 is not physically disconnected from the line.

While this proposal introduces the concept of exercising a maintenance facility by means of varying the voltage supplied to the line by the exchange, it presupposes that the NT1 is under the control of the Network Operator and that the line will be used only for basic ISDN service. User access to basic ISDN in this configuration is at the 4-wire interface on the user side of the NT1.

As will be described later, during the normal POTS off-hook condition the line voltage at the 2-wire termination will be reduced to 10 volts or less, which means that the Ericsson proposal would not be compatible with POTS operation.

According to the present invention there is provided test apparatus for a 2-wire telecommunications line between an exchange and a subscriber termination, comprising voltage sensing means responsive to a DC voltage between the wires of the line supplied from the exchange, said voltage being less than the normal line feed voltage within a voltage range not used in normal operation and switching means controlled by the voltage sensing means to disconnect the subscriber terminating unit from the line and to provide a known terminating impedance for the line.

The requirement is for a termination unit with the following features:

a) transparent in normal use for both POTS and for 2-wire user access to basic ISDN.
b) disconnects terminal apparatus from line and loops the line with a known resistance in test mode.
c) simple test mode control signal from exchange.
d) minimal power consumption (in normal transparent mode).
e) simple, small (preferably housed in current NTE5 case), and very low cost.

BRIEF DESCRIPTION OF THE DRAWING

The present invention will now be described by way of example, with reference to the accompanying figure, which shows a circuit diagram illustrating one embodiment of the invention.

DETAILED DESCRIPTION OF THE PREFERRED EMBODIMENT

The embodiment shown which is based on the NTE5 termination, introduces relay break contacts RL/1, RL/2 in each leg A, B of a 2-wire line between a surge protector P1 and a bell capacitor-resistor combination C1, R1. When the relay RL is operated, by a DC control signal from the exchange (not shown), these contacts RL/1, RL/2 completely isolate the customer's terminal socket SK from the line A, B, including a third terminal X to the telephone bell (not shown), and the line is looped with the known resistance of the relay RL. This facilitates rapid measurement of the line resistance and any leakage to ground or to another line. The quiescent power consumption in normal operational conditions is about 60 mW for a 100 V ISDN feed or 10 mW for 50 V POTS.

Referring to the figure, the incoming line A, B is on the left with the two wires A and B connected to the input terminals T1, T2 of the termination box. The surge protector P1 is connected across the A and B wires which are connected to a customer's telephone/NT1/ISDN terminal socket SK via the relay contacts RL/1 and RL/2 respectively. The bell capacitor-resistor combination R1-C1 and the bell contact X in the terminal socket SK are connected across the A and B wires on the customer's side of the relay contacts RL1, RL2. The relay RL and its control circuit Y are connected to the A and B wires on the network side of the relay contacts RL/1, RL/2 via the diode bridge D1-4 so as to be independent of the polarity of the DC line voltage. The control circuit Y comprises a transistor T1, resistors R2-4, zener diodes D5 and D6 and capacitors C2 and C3. A relay circuit W comprises the relay RL, a flyback suppression diode D7 and transistors T2 and T3 with resistors R5 and R6. The transistor T3 has to be able to withstand voltage surges passing the surge protector P1. Resistor R7 provides a discharge path for the bell capacitor during the test mode.

The operation is as follows:

1. Normal ISDN operation: When the DC line voltage is greater than 40 volts, current flows through the zener diode D5 (33 V) and resistors R2 (200K) and R3 (30K). The current will vary from about 300 $\mu$A at 100 volts to 40 $\mu$A at 40 volts. Transistor T1 held in the saturated 'on' condition due to the collector resistor R4 (300K) and zener diode D6 (9.1 V) with a current of between 300 $\mu$A at 100 volts and 100 $\mu$A at 40 volts, and transistors T2 and T3 are cut off. Power consumption in this state is between 60 mW at 100 volts and 6 mW at 40 volts.

2. Normal POTS operation: When a POTS subscriber goes off-hook and reduces the line voltage to 10 volts or less (this being specified in British Standards BS6305/6317), zener diode D6 (9.1 V) stops conducting and cuts off the base current to transistor T2 and hence to transistor T3, which prevents the operation of the relay RL. Zener diode D5 (33 V) blocks the current to resistors R2 and R3 and transistor T1, and capacitor C2 (1 $\mu$F) discharges to the off-hook voltage. During the off-hook transition from about 38 volts (when T1 turns off) to 10 volts or less, the capacitor C3 absorbs all the current through D6 and R4, keeping the transistors T2 and T3 cut off. During the on-hook transition, when the line voltage rises towards 50 volts, the charging current of the capacitor C2 will cause the transistor T1 to saturate until the zener diode D5 turns on again, so keeping transistors T2 and T3 cut off and preventing the operation of the relay RL.

During ringing, the ringing signal with its DC bias will be rectified by the diode bridge D1-D4; so when the AC ringing voltage is in opposition to the DC bias and the rectified voltage across the control circuit drops, the transistor T1 will be cut off for up to about half the ringing cycle, allowing current to flow via the zener diode D6 and the resistor R4 to the base of the transistor T2 and to charge the capacitor C3. Normally, the rectified ringing voltage will exceed the 38 volt threshold during the peak of this 'opposition' half cycle, turning on the transistor T1 and discharging the capacitor C3: but if there are several bells connected it may not exceed that threshold voltage. The time constant of the resistor R4 and the capacitor C3 are chosen to ensure the transistor T2 does not turn on for the case when the voltage threshold is not exceeded.

3. Test mode: About 20 $\mu$A current flow in the resistor R2 is required to cause the transistor T1 to saturate, so the transistor T1 will start to turn off when the line voltage is reduced to about 38 volts. The test mode is therefore entered by reducing the line feed to say 35 volts at the exchange. In this mode the transistor T1 will be turned off, allowing base current to flow to the transistors T2 and T3 and the relay RL to operate. In order to maximize the power available to operate the relay, the relay coil resistance should be equal to the maximum line length specified for ISDN use, namely 1250 ohms. Allowing for the diode bridge D1-D4, the voltage across the relay RL will drop to a minimum of 17 volts and the minimum power available to operate the relay will be 230 mW. The bell capacitor will discharge through the resistor R7 (100K) without tinkling the bell.

In this state, the line A, B will be isolated from the customer's equipment and the line looped with the 1250 ohms coil of the relay RL. The loop resistance and leakage to ground or to another line can therefore be determined from the exchange.

The return to the normal operational configuration is achieved by reducing the line voltage at the exchange to zero, thereby causing the relay RL to release and the terminating equipment to be reconnected. Normal line feed is then restored from the exchange via a 1 mA constant current (to prevent 'bell tinkle' with a POTS customer) the bell capacitor C1 having been discharged via the resistor R7 during the test mode cycle).

To prevent the relay operating as the line voltage rises across the DC test window of about 10 volts to 38 volts, the charging current of the capacitor C2 must ensure that the transistor T1 is turned well on by the time the line voltage has risen to the 9 volts required for current to start to flow through the zener diode D6, and stays saturated until the line voltage has risen to the 38 volts needed for current to flow through the diode D5. Assuming the line feed is restored via a 1 mA constant current, the slowest line voltage rise time will be when a Network Termination 1 is connected, which will offer a capacitance of 3 $\mu$F to the line. The worst case POTS condition will be when several bells are connected to the 1.8 $\mu$F capacitor C1. The voltage across the Network Termination 1 will rise to 9 volts in about 30 mS. During this period the 1 $\mu$F capacitor C2 will charge to about 1 volt and the charging current in R2 will reach about 40 $\mu$A, ensuring that the transistor T1 will saturate. The Network Termination 1 voltage should rise to 38 volts in 120 mS, by which time the capacitor C2 will have charged to about 10 volts and the charging current available at the base of the transistor T1 will be 140 $\mu$A, ensuring that the transistor T1 remains saturated and that the transistors T2 and T3 remain cut off during the restoration of normal line feed.

A low cost and simple circuit has been described which will facilitate the supervision of a subscriber's line for either basic ISDN service offered at the 2-wire point (U interface) or POTS. By disconnecting the line from the customer's terminal socket with only the bell capacitor C1 and discharge resistor R7 on the customer's side and by terminating the line in a known resistance, rapid measurement of loop resistance and leakage to ground or another line is possible, and clear discrimination of repair responsibility can be determined. Quiescnt power consumption is 60 mW at 100 volts for ISDN or 10 mW at 50 volts for POTS.

Control of this maintenance facility by means of the DC line voltage is simple and unambiguous, and can be incorporated into a testing system such as the System X Integrated Test Function (ITF) sub-system.

The component values of the described circuit have been chosen to conform to current standards in the UK network, but there is flexibility in the design to permit modification of the circuit to conform with the practice of other networks.

To summarise a termination unit is described in which:

1. The unit will terminate the 2-wire line at the customer's premises and is suitable, without modification, for either basic rate ISDN access at the 2-wire point or telephone service (POTS), including any apparatus approved for connection to the telephone network.
2. The unit provides a maintenance supervision facility by disconnecting the line from the customer's terminal socket and looping the line with a known resistance, thereby enabling the rapid measurement of line loop resistance and leakage to ground or to another line and the clear determination of maintenance responsibility in the event of a service failure.
3. The maintenance supervision facility is exercised by changing the DC voltage fed to the line to a value not used in normal operation, but less than the normal line feed voltage.
4. The unit incorporates time constants in its design which ensure that voltage variations occurring in normal operation such as initial activation, off-hook and on-hook transients and ringing signals do not exercise the maintenance supervision facility.
5. The unit is not sensitive to the polarity of the DC line feed voltage.
6. The unit consumes very little power during its quiescent state.
7. The simplicity of the design leads to low cost and small size (probably within the current NTE5 box for terminating POTS), which with its low quiescent power consumption makes it suitable for general deployment in the network for both ISDN and POTS access.

I claim:

1. Test apparatus for a two-wire telecommunications line between an exchange and a subscriber termination unit and connectable thereto, comprising: voltage sensing means responsive to a DC voltage applied between the wires of the line supplied from the exchange, said DC voltage being less than a normal line feed voltage and within a voltage range not used in normal operation; and switching means controlled by the voltage sensing means for disconnecting the subscriber termination unit from the line and for providing a known linear terminating impedance for the line for the duration of the application of said DC voltage.

2. Test apparatus as claimed in claim 1, wherein the switching means comprises a relay having a pair of contacts interposed in each of the wires of the line.

3. Test apparatus as claimed in claim 2 wherein the known terminating impedance is the impedance of the relay coil.

4. Test apparatus as claimed in claim 1, wherein the line is part of an Integrated Services Digital Network.

5. Test apparatus as claimed in claim 1, wherein the line is part of a Plain Ordinary Telephone Service network.

6. Test apparatus as claimed in claim 1, wherein the line is part of a Combined Integrated Services Digital Network and a Plain Ordinary Telephone Service network.

* * * * *